(12) United States Patent
Bian et al.

(10) Patent No.: US 10,849,277 B2
(45) Date of Patent: Dec. 1, 2020

(54) EXTENSION ROD AND POWER TOOL HAVING EXTENSION ROD

(71) Applicant: Suzhou Cleva Electric Appliance Co., Ltd., Suzhou (CN)

(72) Inventors: Xiaoxian Bian, Jiangsu (CN); Jianxin Li, Jiangsu (CN)

(73) Assignee: Suzhou Cleva Electric Appliance Co., Ltd., Suzhou (CN)

( * ) Notice: Subject to any disclaimer, the term of this patent is extended or adjusted under 35 U.S.C. 154(b) by 564 days.

(21) Appl. No.: 15/126,035

(22) PCT Filed: Mar. 11, 2015

(86) PCT No.: PCT/CN2015/074012
§ 371 (c)(1),
(2) Date: Nov. 8, 2016

(87) PCT Pub. No.: WO2015/139572
PCT Pub. Date: Sep. 24, 2015

(65) Prior Publication Data
US 2017/0079215 A1    Mar. 23, 2017

(30) Foreign Application Priority Data

Mar. 17, 2014  (CN) .......................... 2014 1 0096806

(51) Int. Cl.
*A01G 3/08* (2006.01)
*B25F 5/02* (2006.01)
(Continued)

(52) U.S. Cl.
CPC ........... *A01G 3/085* (2013.01); *A01G 3/0255* (2013.01); *A01G 3/08* (2013.01); *B25F 5/02* (2013.01); *B25G 1/04* (2013.01)

(58) Field of Classification Search
CPC ........ A01G 3/085; A01G 3/08; A01G 3/0255; B25F 5/02; B25G 1/04
(Continued)

(56) References Cited

U.S. PATENT DOCUMENTS 1,680,080 A * 8/1928 Benzion .................. F16L 19/04
285/332.1
4,766,783 A * 8/1988 Stanich ................. B25B 13/481
81/177.2
(Continued)

FOREIGN PATENT DOCUMENTS

CN          201057916        6/2008
CN          102823442        12/2012
(Continued)

OTHER PUBLICATIONS

International Search Report for Application No. PCT/CN2015/074012, dated May 22, 2015.

*Primary Examiner* — Thanh K Truong
*Assistant Examiner* — David G Shutty
(74) *Attorney, Agent, or Firm* — JK Intellectual Property Law, PA

(57) ABSTRACT

An extension rod for a power tool may include a plurality of rod portions, with a first connector and a second connector connecting two of the rod portions. The second connector has a sleeve and a primary fastener. The first connector has a guide rod sized for insertion into the sleeve. The first connector also has a secondary fastener engaging with the primary fastener. A first guide ring, a second guide ring, and a third guide ring are located between the guide rod and the sleeve. The first guide ring, the second guide ring, and the third guide ring each include respective conical faces. At least one of the first, second, and third guide rings defines a notch.

16 Claims, 5 Drawing Sheets

(51) Int. Cl.
*B25G 1/04* (2006.01)
*A01G 3/025* (2006.01)

(58) Field of Classification Search
USPC .................................. 285/332, 332.1, 334.4
See application file for complete search history.

(56) References Cited

U.S. PATENT DOCUMENTS

| | | | | |
|---|---|---|---|---|
| 4,803,904 A * | 2/1989 | Stanich | ................ | B25B 13/481 |
| | | | | 81/177.2 |
| 4,944,699 A * | 7/1990 | Velke, Sr. | .............. | H01R 4/308 |
| | | | | 174/84 S |
| 5,195,904 A * | 3/1993 | Cyvoct | ............. | H01R 13/6277 |
| | | | | 439/349 |
| 5,458,144 A * | 10/1995 | Lavine | ..................... | A45B 9/02 |
| | | | | 135/24 |
| 5,649,780 A | 7/1997 | Schall | | |
| 6,645,011 B2 * | 11/2003 | Schneider | .......... | H01R 13/6277 |
| | | | | 439/578 |
| 7,721,377 B2 * | 5/2010 | Jungklaus | ................ | B25G 1/04 |
| | | | | 15/144.1 |
| 7,721,391 B2 * | 5/2010 | Bukovitz | ................ | B25G 3/14 |
| | | | | 15/145 |
| 8,079,151 B2 * | 12/2011 | Chen | ........................ | A01G 3/08 |
| | | | | 15/144.1 |
| 8,490,250 B2 * | 7/2013 | Lanz | ........................ | B25G 1/04 |
| | | | | 16/427 |
| 9,651,073 B2 * | 5/2017 | Bukovitz | ................ | F16B 7/1454 |
| 10,033,122 B2 * | 7/2018 | Burris | .................... | H01R 13/59 |
| 2001/0024594 A1 * | 9/2001 | Taylor | ..................... | B25G 1/04 |
| | | | | 403/109.7 |
| 2002/0042997 A1 * | 4/2002 | Uhl | ......................... | A01G 3/08 |
| | | | | 30/382 |
| 2002/0088091 A1 * | 7/2002 | Grote | ................. | B05C 17/0205 |
| | | | | 16/429 |
| 2005/0097691 A1 * | 5/2005 | Tsuchiya | ................ | A47L 13/20 |
| | | | | 15/144.4 |
| 2005/0274230 A1 * | 12/2005 | Lin | ....................... | B25B 15/001 |
| | | | | 81/58.3 |
| 2005/0279520 A1 * | 12/2005 | Newman | ................. | B25B 13/48 |
| | | | | 174/544 |
| 2006/0048397 A1 * | 3/2006 | King | ......................... | A01G 3/08 |
| | | | | 30/296.1 |
| 2007/0007026 A1 * | 1/2007 | Hofmann | ................ | B24B 23/02 |
| | | | | 173/216 |
| 2009/0245924 A1 * | 10/2009 | Whitling | ................. | F16B 7/042 |
| | | | | 403/13 |
| 2009/0274511 A1 * | 11/2009 | Chen | ...................... | F16B 7/1427 |
| | | | | 403/109.5 |
| 2009/0305560 A1 * | 12/2009 | Chen | .................. | H01R 13/6277 |
| | | | | 439/584 |
| 2010/0170547 A1 * | 7/2010 | Pietrzak | ................... | A45B 9/00 |
| | | | | 135/75 |
| 2011/0002734 A1 * | 1/2011 | Chen | ....................... | A47L 13/42 |
| | | | | 403/350 |
| 2012/0155958 A1 * | 6/2012 | Donohue | ................. | B25G 1/04 |
| | | | | 403/350 |
| 2012/0225581 A1 * | 9/2012 | Amidon | ............... | H01R 13/622 |
| | | | | 439/584 |
| 2014/0000065 A1 * | 1/2014 | Bukovitz | ................. | B25G 3/00 |
| | | | | 16/429 |
| 2014/0020848 A1 * | 1/2014 | White | ..................... | B25B 15/02 |
| | | | | 157/1.3 |
| 2014/0033549 A1 * | 2/2014 | Ramsey | .................. | B25F 5/026 |
| | | | | 30/381 |
| 2014/0041939 A1 * | 2/2014 | Schlachter | ........... | H02G 15/013 |
| | | | | 174/77 R |
| 2015/0089821 A1 * | 4/2015 | Troudt | ..................... | B25G 1/04 |
| | | | | 30/519 |
| 2016/0114477 A1 * | 4/2016 | Saccoccio | ................ | B25G 1/04 |
| | | | | 294/190 |
| 2016/0190781 A1 * | 6/2016 | Hendricks | ................ | B25G 1/04 |
| | | | | 294/132 |
| 2016/0236339 A1 * | 8/2016 | Flaherty | .................. | B25G 1/04 |
| 2017/0079215 A1 * | 3/2017 | Bian | ........................ | A01G 3/08 |
| 2018/0103819 A1 * | 4/2018 | Hoyle | ..................... | B25G 1/04 |

FOREIGN PATENT DOCUMENTS

| | | |
|---|---|---|
| CN | 203775753 | 8/2014 |
| EP | 1634679 | 3/2006 |
| WO | 2013036967 | 3/2013 |

* cited by examiner

EXTENSION ROD AND POWER TOOL HAVING EXTENSION ROD

CROSS REFERENCE TO RELATED APPLICATIONS

This application is a national stage of International Application No. PCT/CN2015/074012, filed Mar. 11, 2015, and claims benefit of Chinese Patent Application No. CN201410096806.5, filed Mar. 17, 2014, both of which are incorporated by reference herein.

TECHNICAL FIELD

The disclosure relates to an extension rod for extending a power tool, and an electric power tool using the extension rod.

BACKGROUND ART

A power tool, such as a pruning tool, for example a trimming saw or pruning shears, is usually used to cut and prune trees, bushes, etc. For convenience in use, the height of such tool can be extended generally through an extension rod so as to prune bushes and branches out of reach of the human body height, such that an operator can operate such tool conveniently without the help of tools, such as a ladder. Generally, a power portion is provided on an end of the extension rod. In the course of use, the operator holds the other end of the tool with hands to lift the power tool including the extension rod to operate. An operating device for controlling the work of the power tool is provided on an end, close to the operator, of the extension rod. In order to avoid a "top-heavy" phenomenon, an existing tool is generally provided with an energy supply device on the other end, opposite to the power tool, of the rod, for example, a battery pack of an electric pole pruning saw with an extension rod is placed on the tail of the extension rod, and electric power is transmitted to a motor of the pole pruning saw through a wire inside the extension rod. Meanwhile, in order to avoid the inconvenience in packaging, transportation, storage and the like due to the length of the extension rod, an extension rod has been developed consisting of multiple rod portions, the multiple rod portions being engaged through connectors, wherein a wire for power transmission is also provided inside the rod, and a separable electrical connection mechanism for power transmission is also provided at the connectors. In the course of use, the effective working height of the power tool can be extended by engaging the rod portions together.

For example, the patent CN1748458B discloses an extension rod of a power tool. The extension rod comprises: at least three portions, wherein each rod portion includes an electric conductor inside for transmitting electric energy, and each rod portion can be connected with the adjoining rod portion for electrical connection of the adjoining rod portions. The at least three rod portions include a first rod portion containing a handle and a power supply, a second rod portion located between the first rod portion and a third rod portion, and a third rod portion containing a power tool;

a first connecting portion which is combined with the first rod portion and the second rod portion and comprises a first plug and a first socket, the first plug being adapted into the first socket by means of its proper shape and is prevented from rotating;

a second connecting portion which is combined with the second rod portion and the third rod portion and comprises a second plug and a second socket, the second plug being adapted into the second socket by means of its proper shape and is prevented from rotating;

wherein the shape of the first connecting portion is different from that of the second connecting portion, such that the first rod portion may be connected to the second or third rod portion; and wherein, when the rod portions are connected, electric energy from the power supply can be transmitted to the power tool.

The electric power tool disclosed by the above patent includes at least multiple rod portions by which the power supply and the electric power tool are connected, wherein the power supply is provided on the rod. However, when multiple rods are connected to one another, clearances among the connecting portions will cause the rocking of the extension rod in the course of use, especially when the power tool located on an end of the extension rod is heavier or the drag of the power tool in the course of operation by its power to the extension rod is relatively large. Such rocking will cause electrical connection break between rods, and the power tool will be difficult to operate and unlikely to control in the course of working because the power tool fails to work normally due to poor contact between plugs and sockets between rods. Therefore, it is necessary to provide an extension rod which can reduce the rocking of the extension rod and the power tool in the course of use and prevent the electrical connection between rods from being broken during use, such that the power tool is easier to control.

SUMMARY

The present disclosure aims to provide an extension rod and a power tool that operate well. The extension rod can reduce the rocking of the extension rod and the power tool in the course of use and prevent the electrical connection between rods from being broken during use, such that the power tool is easier to control. Therefore, the present disclosure relates to an extension rod and a power tool having an extension function. The extension rod comprises multiple rod portions, with the rods connected via a first connector and a second connector; the second connector has a sleeve and a primary fastener, the first connector includes a guide rod capable of being inserted into the sleeve, and the first connector also includes a secondary fastener engaging with the primary fastener; a first guide ring, a second guide ring and a third guide ring are located between the guide rod and the sleeve; the first guide ring, the second guide ring and the third guide ring include adjoining conical faces; and at least one of the guide rings includes a notch. The power tool is equipped with a working head on an end of the rod, an assembly for controlling the work of the power part is mounted on the rod, and an operating handle is located on the rod.

In order to further solve the above problems better, the present invention further provides the following preferred technical solutions:

Preferably, the second guide ring is located between the first guide ring and the third guide ring and has two conical faces whose directions are opposite, and the first guide ring and the third guide ring include conical faces engaging with the second guide ring, respectively.

Preferably, the conical faces of the second guide ring are located on two ends of the guide ring and located on the inner surface of the guide rings, and the conical faces of the first guide ring and the third guide ring are positioned on the outer surface of the guide rings.

Preferably, the conical faces of the second guide ring are located on two ends of the guide ring and located on the outer surface of the guide rings, and the conical faces of the first guide ring and the third guide ring are located on the inner surface of the guide rings.

Preferably, the second guide ring includes a notch which extends from one end to the other end of the guide ring.

Preferably, the first guide ring and the second guide ring are respectively include a notch which extends from one end to the other end of the respective guide ring.

Preferably, the first connector and the second connector include a guide ring limiting part respectively.

Preferably, the second guide ring is clamped tightly by the first guide ring and the third guide ring when the primary fastener and the secondary fastener are used for fastening.

Preferably, the first connector and the second connector include a plug or a socket, and the corresponding plug is inserted into the socket when the first connector and the second connector are engaged.

Preferably, an electric conductor which is configured to transmit electric power and connected with the connectors is also provided in the rod.

When the conical faces of the second guide ring are located on the inner surface of the guide rings and the conical faces of the first guide ring and the third guide ring are located on the outer surface of the guide rings, the second guide ring expands when the guide rings are clamped.

When the conical faces of the second guide ring are located on the outer surface of the guide rings and the conical faces of the first guide ring and the second guide ring are located on the outer surface of the guide rings, the first guide ring and the third guide ring expand when the guide rings are clamped. The notch makes the guide rings have certain elasticity, and the guide rings can recover after foreign force disappears.

When the fasteners are used for fastening, the first guide ring and the third guide ring clamp the second guide ring, such that the guide ring provided with the notch expands to eliminate a gap between the guide rod and the sleeve. No rocking space exists between rods after the gap between the guide rod and the sleeve is eliminated, such that the extension rod can reduce the rocking of the extension rod and the power tool in the course of use and prevent the electrical connection between rods from being broken during use, and therefore, the power tool is easier to control.

DETAILED DESCRIPTIONS OF THE PREFERRED EMBODIMENTS

Embodiment 1

Figure 1:
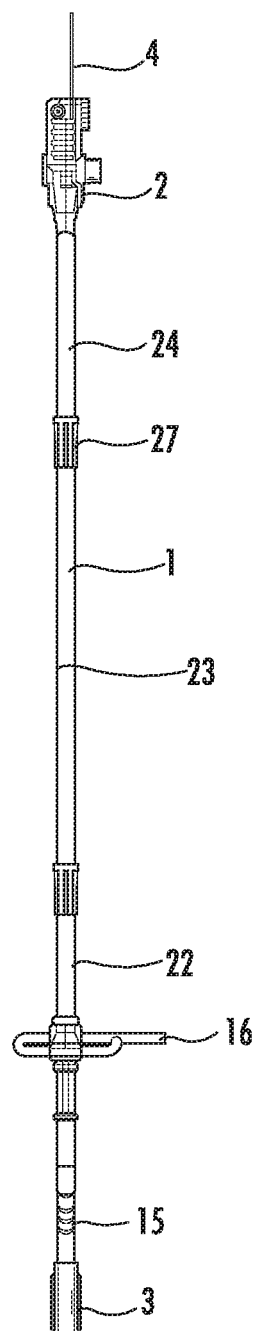
FIG. 1 shows a top view of an assembled power tool.

A power tool as shown in FIG. 1 includes a long rod consisting of multiple connecting rods 1, the rods being connected to one another via a first connector 20 and a second connector 21. As shown in FIG. 1, three rods are used, and more or less rods may also be used in order to lengthen or shorten the length of the power tool. The length after the multiple rods are connected to one another is approximately equal to the sum of the lengths of all the rods. The rods are made of a light-weight and high-strength material, such as aluminum alloy. The upper end of the long rod is connected with a working head 2 which is a customary power saw, but the working head is not only limited to a power saw, and may be any other generally used power tool, such as a pruning machine. The power saw comprises a working saw blade 4 and a motor for driving the saw blade, the motor being provided at a lower position of a saw body. The power of the motor comes from a battery pack 3 provided at the lower end of the long rod in a manner that is easy to assemble and disassemble. A conductor for power transmission is provided inside the long rod; one end of the conductor is connected with the battery pack 3 and the other end of the conductor is connected with the motor. Wires 14 having insulation layers are generally adopted as the conductor. A control device for controlling the motor is connected in series to a loop of the wires 14 and the motor. The control device comprises a known power switch which is generally provided at a position close to a primary handle 15. The primary handle is located above the battery pack 3. A secondary handle 16 which is U-shaped appropriately is located near the primary handle. The primary handle 15 is held to control the power switch in the course of operating the power tool, and meanwhile, the secondary handle 16 is held to stabilize the power tool.

Figure 2:
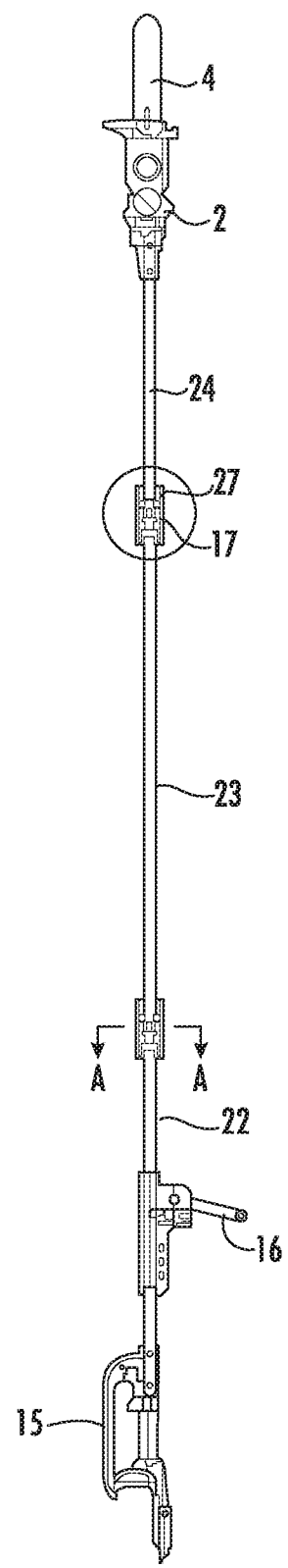
FIG. 2 shows a side sectional view of the assembled power tool.

The long rod as shown in FIG. 2 is shaped as a hollow pipe in which two wires 14 are disposed, wherein the tail ends of the wires are connected to electrical connectors 17 between which a plug 18 and a socket 19 which can be assembled and disassembled conveniently and electrically connected are located. The rods are connected together via a first connector 20 and a second connector 21. The long rod comprises a bottom rod 22, an intermediate rod 23 and a top rod 24, wherein the bottom rod 22 includes the second connector 21, and the second connector is connected with the first connector 20 at the lower part of the intermediate rod. The upper end of the intermediate rod 23 includes the same second connector 21 which is connected with the first connector 20 of the top rod. Obviously, two second connectors 21 may also be located on the intermediate rod and the first connectors 20 may be located on the top rod and the bottom rod, or two first connectors 20 are located on the intermediate rod 23 and the second connectors 21 are located on the top rod and the bottom rod, or other easily conceivable combination of connectors which can be used for connecting the multiple rods is also available. The first connector 20 and the second connector 21 include fasteners which can be engaged with each other generally using a threaded structure or a buckle structure.

Figure 3:
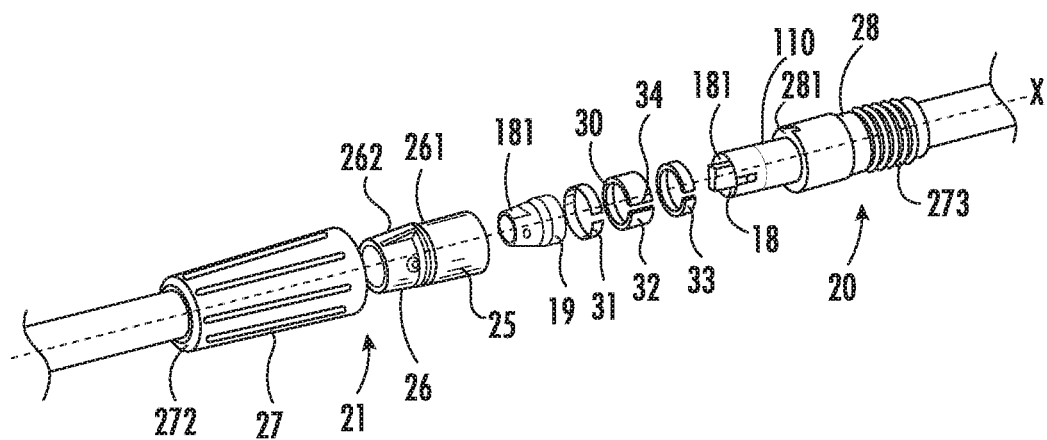
FIG. 3 shows an exploded schematic view of connectors between rods.
Figure 4:
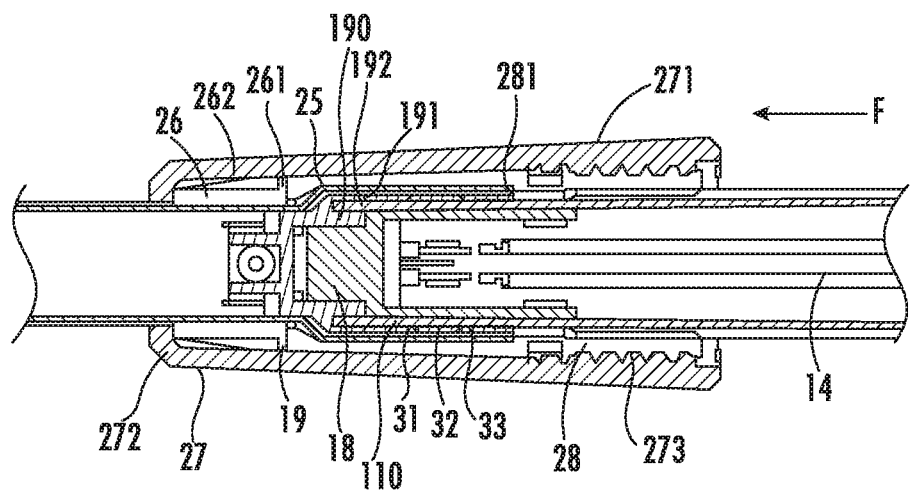
FIG. 4 shows a locally enlarged sectional view of structure of the connectors between rods.
Figure 5:
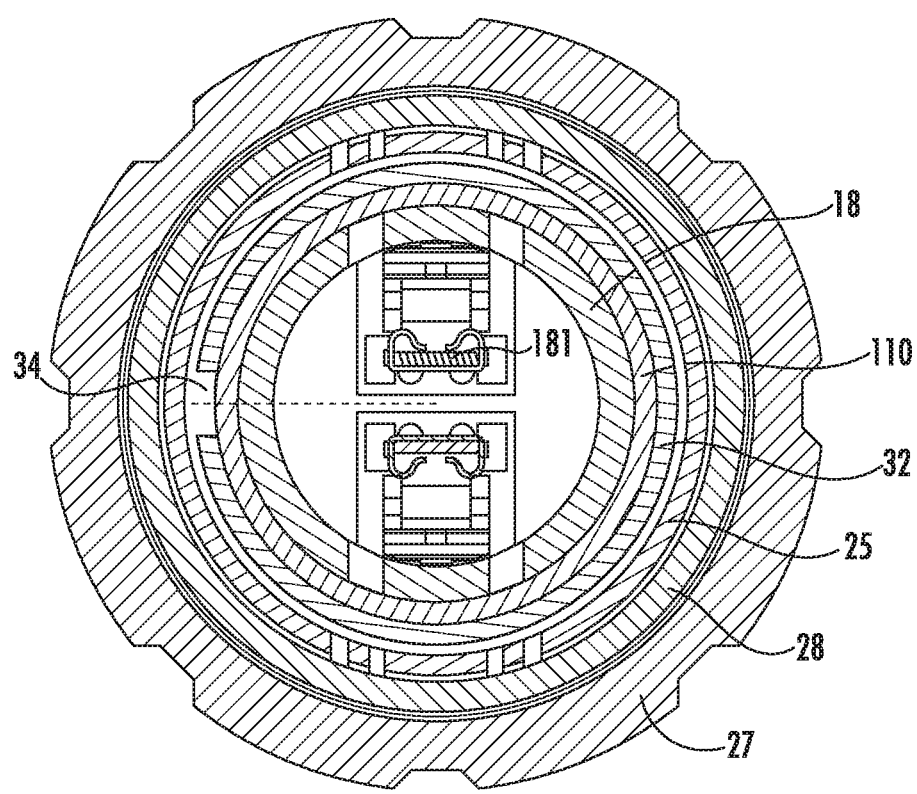
FIG. 5 shows a sectional view taken along a section A-A in FIG. 2.

As shown in FIGS. 3-5, the second connector 21 is located at the tail end of the rod. The rod is shaped as a hollow pipe, and the tail end of the rod expands outward radially to form a bowl-shaped sleeve 25 for receiving the adjoining rod. A limiting part 26 is fixed behind the sleeve 25. The limiting part is annular and surrounds the rod behind the sleeve 25. The front end of the limiting part 26 includes ribs 261 which are annularly disposed, ribs 262 which extend longitudinally are located on the outer surface of the limiting part, and the limiting part 26 is fixed with the rod by adopting a general manner, such as screws or a riveting manner. A primary fastener 27 which is appropriately conical surrounds the outside of the limiting part and the sleeve 25. The primary fastener has an appropriately conical space 271 inside. The rear part of the primary fastener extends inward radially to form a hook portion 272 which can prop against the limiting part. The primary fastener and the secondary fastener of the first connector are fixed through a thread 273. When the primary fastener is screwed tight, the primary fastener 27 and the secondary fastener 28 pull the first connector 20 and the second connector 21 closer together, such that a guide rod 110 at the front end of the first connector 20 is inserted into the sleeve 25 of the second connector. The primary fastener 27 has a function of enabling the guide rod 110 of the first connector to be inserted into the sleeve 25 of the second connector, such that the first connector 20 and the second connector 21 are fixed, and therefore the primary fastener 27 and the secondary fastener 28 are not limited to a thread structure. A typical existing structure which can enable the guide rod to be inserted into the sleeve and fixed can be considered as an alternative embodiment.

An electric connection plug 18 for delivering electric power is located at the front end of the guide rod 110 and is located inside the guide rod 110. Two sides of the plug 18 and the secondary fastener 28 are riveted to the guide rod 110 respectively; a plug electrode 181 is located in the plug 18 and is connected with the wires 14 inside the rod. The plug 18 is made of an insulated nylon material with relatively high strength, A socket 19 for receiving the plug 18 is located inside the second connector 21 and is located inside the sleeve 25 of the second connector. The outer diameter of the socket 19 is just suitable to be adhered to an inner wall of the sleeve 25. A plug electrode 181 which is engaged with the electrode of the plug 18 is located in the socket 19. A metal contact is generally adopted as the plug electrode 181, When the first connector and the second connector are connected, the corresponding plug electrodes 181 can also be connected to one another, such that electric energy can be delivered through the connectors. The socket 19 is of a double-layer annular structure and includes an inner ring 190 and an outer ring 191, wherein the inner ring forms a space for receiving the plug 18, the receiving space has a D-shaped section, and the corresponding plug 18 also has a D-shaped cross section. The D-shaped plug and the socket 19 can prevent the connectors from rotating in the course of use. Of course, the connectors capable of being prevented from rotating are not limited to a D shape, and other suitable shapes may also be considered as alternative structures of connectors. An annular cavity 192 is formed between the inner ring and the outer ring. When the connectors are connected, the front end of the guide rod 110 is inserted into the annular cavity 192

The outer surface of the guide rod 110 and the inner surface of the sleeve 25 include three guide rings adjoined in position, including a first guide ring 31 and a third guide ring 33 located at two ends, and a second guide ring 32 located in the middle. All the guide rings are made of steel which has good rigidity and wear resistance. The outer side of the first guide ring 31 is adjoined to the tail end of the outer ring of the plug 18. The third guide ring 33 is adjoined to a wall 281, which extends inward radially, of the secondary fastener 28. Truncated conical frustoconical) faces 30 are formed on ends inside the first guide ring and the third guide ring. Conical (frustoconical) faces 30 which are anastomotic with the conical faces of the first guide ring and the third guide ring are provided on two ends of the second guide ring 32. In this embodiment, the section of the guide ring along axis X conical face is a straight line extending in a certain angle, An included angle between the straight line of the sections of the first guide ring the third guide ring and the inner surface of the guide rings is an acute angle, and the conical faces of the first guide ring and the third guide ring are located on the outer surface of the guide rings and are convex outward. An included angle between the straight line of the section of the second guide ring and the inner surface of the guide rings is an obtuse angle, and the conical faces of the second guide ring 32 are located on the inner surface of the guide rings and are concave inward. It's worth noting that the conical faces adopted in the present invention are same as a face formed by rotating the straight line along axis X. As an alternative substitution solution, the conical faces may also be the same as a face formed by rotating other curve along axis X, for example, a paraboloid is provided on the outer end inside the first guide ring and the third guide ring 33 and the first guide ring and the third guide ring are convex outward. The second guide ring 32 includes a paraboloid anastomotic with the first guide ring and the third guide ring, and is concave inward (refer to FIG. 3). The width of the second guide ring 32 is greater than the width of the first guide ring and the width of the third guide ring 33. The width of the second guide ring 32 is equal to the sum of the widths of the first guide ring and the third guide ring 33. In the present disclosure, it is set that the width of the first guide ring is equal to that of the third guide ring 33. The thickness of a wall of the first guide ring 31 is equal to that of a wall of the third guide ring 33, and the sum of the thicknesses of the first guide ring 31 and the third guide ring 33 is greater than a height of a gap G between the outer surface of the guide rod 110 and the inner surface of the sleeve 25. In this embodiment, the thickness of the second guide ring 32 is equal to the thickness of the first guide ring and the thickness of the third guide ring. The wall of the second guide ring 32 includes a notch 34 which extends from one end to the other end of the guide rings along the axis X of the guide rings. The notch 34 is rectangular, and it is also easily conceivable that the notch may also be set into other shapes, such as trapezoid, wedge, irregular polygon or other shapes having, arcs. The notch 34 is set for the purpose of enabling the guide rings having great rigidity to have certain elasticity, such that the second guide ring 32 can expand to contract the gap G between the guide rod 110 and the sleeve 25 when the connectors are fastened, and the guide rings can automatically recover to a state before expansion after the connectors are separated. For convenience in assembly, it is selectable that a notch 34 which is the same that of the second guide ring 32 is located on the first guide ring 31 and the third guide ring 33 respectively, and the first guide ring and the third guide ring may also not include the notch.

In the course of installation, the guide rod 110 is inserted into the sleeve 25, the plug 18 on the guide rod 110 enters a D-shaped space of the socket inside the sleeve, and the first guide ring, the second guide ring and the third guide ring are located in the gap G between the guide rod 110 and the sleeve 25. The primary fastener 27 is rotated to pull the secondary fastener 28 and the guide rod 110 towards the sleeve 25 (see arrow F for the direction). Due to a limiting role of the outer ring 191 of the socket and an inward extending wall 281 of the secondary fastener 28, the first guide ring and the third guide ring clamp their conical faces 30 to enter the lower side of the conical faces of the second guide ring, and the second guide ring 32 expands outward radially under the action of the conical faces 30 of the first guide ring and the third guide ring and contracts the gap G between the guide rod 110 and the sleeve 25. The second guide ring 32 has a certain width, and the contact area of the expanded second guide ring and the inner surface of the sleeve 25 is also large, such that no rocking occurs between the guide rod 110 and the sleeve 25. The expanded guide ring, the guide rod 110 and the sleeve 25 are in a close-fit state. The sum of the thicknesses of the second guide ring 32 and the first guide ring 31 or the third guide ring is greater than the gap G between the guide rod 110 and the sleeve 25. Therefore, the gap G between the guide rod 110 and the sleeve 25 may also be eliminated completely, such that no rocking space exists between the sleeve 25 and the guide rod 110. When the power tool is used, the plug 18 and the socket 19 in the connectors may not be disconnected due to any rocking of the rod.

Embodiment 2

Figure 6:
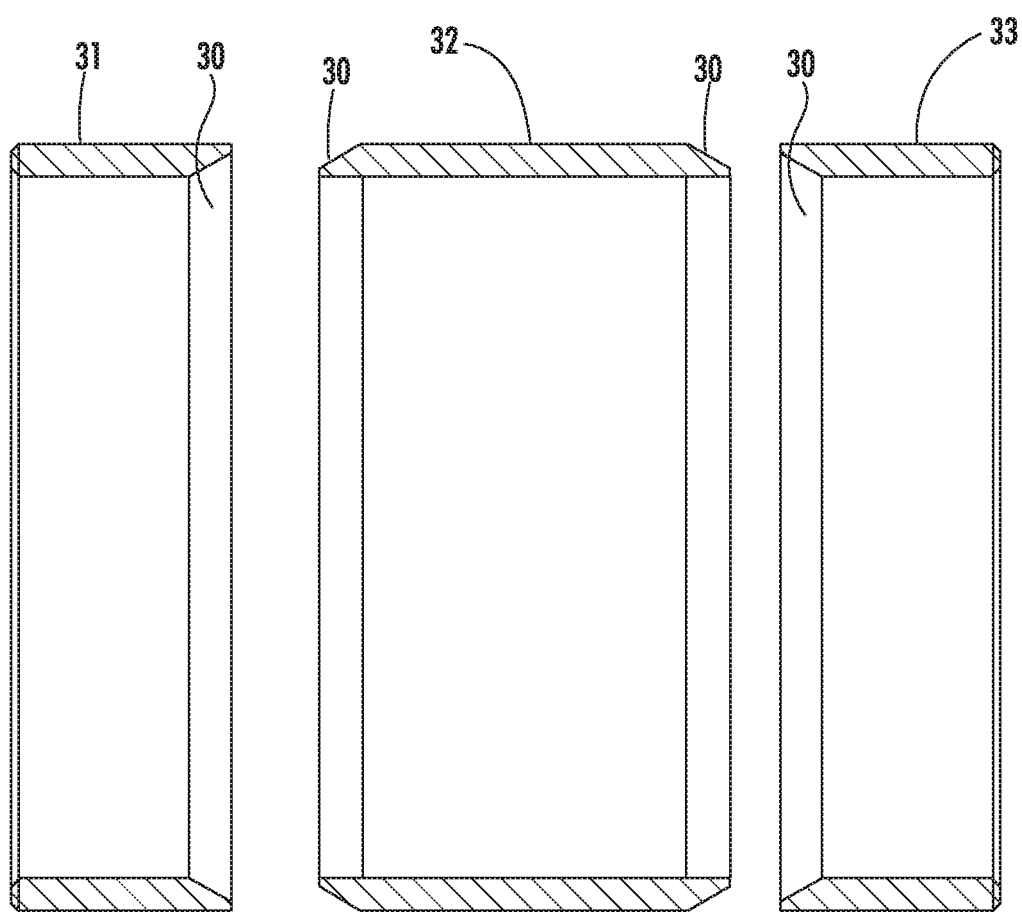
FIG. 6 shows a schematic sectional view of the guide rings in Embodiment 2.

Referred to FIG. 6, what is different from Embodiment 1 in that the conical faces 30 on two ends of the second guide ring 32 are convex outward and are located on the outer surface of the guide rings. The conical faces on adjoining ends of the first and third guide rings and the second guide ring 32 are concave inward and are located on the inner surface of the guide rings. The first guide ring 31 and the third guide ring 33 include the same notch as that in Embodiment 1. For convenience in assembly, it is selectable that the second guide ring 32 includes the notch 34, or may also be not include the notch. The primary fastener 27 is rotated to pull the secondary fastener 28 and the guide rod towards the sleeve 25. Due to a limiting role of the outer ring of the socket 19 and an inward extending wall 281 of the secondary fastener 28, the first guide ring and the third guide ring clamp the second guide ring 32. The conical faces, which are in contact with the second guide ring 32, of the first guide ring and the third guide ring are concave inward, the conical faces 30 of the second guide ring 32 enters to the lower sides of the conical faces of the first guide ring and the third guide ring. At this moment, the first guide ring 31 and the third guide ring 33 expand outward radially under the action of the second guide ring 32 and contract the gap G between the guide rod 110 and the sleeve 25. The sum of the thicknesses of the second guide ring 32 and the first or third guide ring 33 is greater than the gap G between the guide rod 110 and the sleeve 25. This embodiment may achieve the same technical effect as Embodiment 1, that is, the gap G between the guide rod 110 and the sleeve 25 may be eliminated completely, and such that no rocking space exists between the rods. When the power tool is used, the plug 18 and the socket 19 in the connectors may not be disconnected due to any rocking of the rod.

In short, when the primary fastener 27 and the secondary fastener 28 are used for fastening, the first guide ring 31, the second guide ring 32 and the third guide ring 33 are clamped. The notch makes the rigid guide rings have the elasticity, i.e., has expansion and recovery characteristics. The first guide ring 31 and the third guide ring 33 include with conical faces engaging with the second guide ring 32. The conical faces are located according to the manner in Embodiment 1, such that the second guide ring 32 expands to eliminate the gap G between the guide rod 110 and the sleeve 25. The conical faces are located, according to the manner in Embodiment 2, such that the first guide ring 31 and the third guide ring 33 expand to eliminate the gap G between the guide rod 110 and the sleeve 25. The gap G between the guide rod 110 and the sleeve 25 is eliminated, and no rocking space exists between rods. The extension rod can reduce the rocking of the extension rod and the power tool in the course of use and prevent the electrical connection between rods from being broken during use, and therefore, the power tool is easier to control.

The above embodiments are preferred embodiments of the present disclosure. There may be other transformations for the technical solution of the present disclosure, for example, the conical faces may be formed by rotating a parabola, the conical face between the guide rings may be a parabola, or the conical face may also be formed by rotating another curve. The above preferred embodiments are just for illustrating the technical concepts and characteristics of the present disclosure with a purpose of ensuring that those skilled in the art could understand and implement the content of the present disclosure, rather than limiting the protection scope of the present disclosure. All the equivalent variations or modifications made according to the essence of the spirit of the present invention should fall into the protection scope of the present disclosure.

The invention claimed is:

1. An extension rod for a power tool comprising:
   a plurality of rod portions;
   a first connector and a second connector connecting two of the rod portions;
   the second connector having a sleeve and a primary fastener, the first connector having a guide rod sized for insertion into the sleeve toward an inserted position, and the first connector also having a secondary fastener engaging with the primary fastener, the sleeve defining an inner surface ending at a radially-extending surface, the guide rod defining an outer surface ending at a radially-extending surface, the outer surface being spaced from the inner surface by a gap having a height;
   a first guide ring, a second guide ring and a third guide ring located in the gap in axial sequence and in contact with one another axially between the radially-extending surface of the sleeve and the radially-extending surface of the guide rod and radially between the outer surface of the guide rod and the inner surface of the sleeve;
   the first guide ring, the second guide ring and the third guide ring each including respective mating frustoconical faces; and
   at least one of the first guide ring, the second guide ring, and the third guide ring defining a notch;
   wherein when the guide rod is in the inserted position, the second guide ring is in contact with one of the inner surface of the sleeve or the outer surface of the guide rod, and the first guide ring and the third guide ring are in contact with the other of the inner surface of the sleeve or the outer surface of the guide rod to prevent axial misalignment between the guide rod and the sleeve.

2. The extension rod for the power tool according to claim 1, wherein the second guide ring is located between the first guide ring and the third guide ring and has two frustoconical faces oriented in opposite directions, and the first guide ring and the third guide ring each include respective frustoconical faces engaging with the two frustoconical faces of the second guide ring.

3. The extension rod for the power tool according to claim 2, wherein the two frustoconical faces of the second guide ring are located on two ends of and on an inner surface of the second guide ring, and the two frustoconical faces of the first guide ring and the third guide ring are positioned on respective outer surfaces of the first guide ring and the third guide ring.

4. The extension rod for the power tool according to claim 3, wherein the second guide ring defines a notch which extends between the two ends of the second guide ring.

5. The extension rod for the power tool according to claim 2, wherein the two frustoconical faces of the second guide ring are located on two ends of and on an outer surface of the second guide ring, and the frustoconical faces of the first guide ring and the third guide ring are located on respective inner surfaces of the first guide ring and the third guide ring.

6. The extension rod for the power tool according to claim 5, wherein the first guide ring and the third guide ring each respectively define a notch which extends from one end to another end of the respective first guide ring and the third guide ring.

7. The extension rod for the power tool according to claim 1, wherein the first connector and the second connector each respectively include a guide ring limiting part.

8. The extension rod for the power tool according to claim 1, wherein the first connector includes one of a plug and a socket, and the second connector includes the other of a plug and a socket, the plug being inserted into the socket when the first connector and the second connector are engaged.

9. The extension rod for the power tool according to claim 8, further including an electric conductor configured to transmit electric power and connected with the first connector and the second connector.

10. The extension rod for the power tool according to claim 1, wherein the first guide ring and the third guide ring have a first given thickness and the second guide ring has a second given thickness, a sum of the first given thickness and the second given thickness being at least equal to the height of the gap.

11. The extension rod for the power tool according to claim 10, wherein the sum is greater than the height of the gap.

12. The extension rod for the power tool according to claim 1, wherein the second guide ring is in the contact with the outer surface of the guide rod and the first guide ring and the third guide ring are in contact with the inner surface of the sleeve.

13. A power tool comprising:
an extension rod including a plurality of rod portions;
a working head located on an end of the extension rod;
an assembly for controlling the working head mounted on the extension rod;
an operating handle located on the extension rod;
a first connector and a second connector connecting two of the rod portions;
the second connector having a sleeve and a primary fastener, the first connector having a guide rod sized for insertion into the sleeve toward an inserted position, and the first connector also having a secondary fastener engaging with the primary fastener, the sleeve defining an inner surface ending at a radially-extending surface, the guide rod defining an outer surface ending at a radially-extending surface, the outer surface of the guide rod being spaced from the inner surface of the sleeve by a gap having a height;
a first guide ring, a second guide ring and a third guide ring located in the gap in axial sequence and in contact with one another axially between the radially-extending surface of the sleeve and the radially-extending surface of the guide rod and radially between the outer surface of the guide rod and the inner surface of the sleeve;
the first guide ring, the second guide ring and the third guide ring each including respective mating frustoconical faces; and
at least one of the first guide ring, the second guide ring, and the third guide ring defining a notch;
wherein when the guide rod is in the inserted position, the second guide ring is in contact with one of the inner surface of the sleeve or the outer surface of the guide rod, and the first guide ring and the third guide ring are in contact with the other of the inner surface of the sleeve or the outer surface of the guide rod to prevent axial misalignment between the guide rod and the sleeve.

14. The power tool according to claim 13, wherein the first guide ring and the third guide ring have a first given thickness and the second guide ring has a second given thickness, a sum of the first given thickness and the second given thickness being at least equal to the height of the gap.

15. The power tool according to claim 14, wherein the sum is greater than the height of the gap.

16. The power tool according to claim 13, wherein the second guide ring is in the contact with the outer surface of the guide rod and the first guide ring and the third guide ring are in contact with the inner surface of the sleeve.

* * * * *